Feb. 2, 1954 H. S. GLEASON 2,668,021

MAGAZINE ASSEMBLY

Filed March 30, 1951 5 Sheets-Sheet 1

INVENTOR.
HOWARD S. GLEASON
BY T. L. Bowes
ATTORNEY

INVENTOR.
HOWARD S. GLEASON
BY T. L. Bowes
ATTORNEY

Feb. 2, 1954 H. S. GLEASON 2,668,021

MAGAZINE ASSEMBLY

Filed March 30, 1951 5 Sheets-Sheet 3

INVENTOR.
HOWARD S. GLEASON
BY T. L. Bowes
ATTORNEY

Feb. 2, 1954 H. S. GLEASON 2,668,021

MAGAZINE ASSEMBLY

Filed March 30, 1951 5 Sheets-Sheet 4

INVENTOR.
HOWARD S. GLEASON

BY T. L. Bowes

ATTORNEY

Feb. 2, 1954 H. S. GLEASON 2,668,021

MAGAZINE ASSEMBLY

Filed March 30, 1951 5 Sheets-Sheet 5

INVENTOR.
HOWARD S. GLEASON
BY T. L. Bowes
ATTORNEY

Patented Feb. 2, 1954 2,668,021

UNITED STATES PATENT OFFICE 2,668,021

MAGAZINE ASSEMBLY

Howard S. Gleason, Rochester, N. Y., assignor to Stromberg-Carlson Company, a corporation of New York Application March 30, 1951, Serial No. 218,399

5 Claims. (Cl. 242—54)

This invention relates to magazine assemblies such as may be used with photographic film and in sound recording and reproducing machines and is particularly applicable to such apparatus employing a magnetic tape as a signal carrying medium and a removable magazine although the invention is not limited thereto.

Magnetic recording and reproducing apparatus has heretofore been provided with removable magazines containing reels for guiding tape, wire, etc., the driving mechanism, heads, amplifier, etc., usually being carried by a suitable supporting frame, container, or the like.

It is an object of this invention to provide a new and improved removable magazine for such apparatus.

Another object of this invention is to provide a new and improved magazine for use in sound recording and reproducing apparatus.

Still another object of this invention is to provide a new and improved magazine for use in magnetic recording and reproducing apparatus in which the loading of the magazine is improved.

Still another object of the present invention is to provide a new and improved magazine for use in magnetic recording and reproducing apparatus in which the magazine has a minimum number of parts and the driving equipment and as many as possible of the other parts are carried on the main frame, container, or the like.

The foregoing objects of my invention are carried out in the preferred embodiment of my invention by providing a magazine having a two-part container or housing including a front cover and a rear cover. Within the housing there is assembled a pair of coaxially disposed flanged reels and adjacent the edges of the reels there is provided a plurality of locating devices for approximately locating the reels during the assembly and loading of the magazine.

In order to maintain separate the two reels and to provide for relative motion between them, there is provided a first spring member and a ball bearing assembly between the two reels. In order to separate one of the reels from the front cover there is provided a second spring member and a ball assembly. The reels are supported from the rear of the assembly by a pair of driving spindles which extend through the rear cover into engagement respectively with the two reels. Means for guiding the movement of the tape from one reel to the other is also carried by the magazine. The means for driving the tape and the various heads employed as well as the motors, amplifier, etc., are carried by the associated frame or panel upon which the magazine is adapted to be carried.

Other objects and advantages of my invention will become apparent as the following descriptions proceeds, and the features of novelty which characterize my invention will be pointed out with particularity in the claims annexed to and forming a part of this specification.

Figure 1:
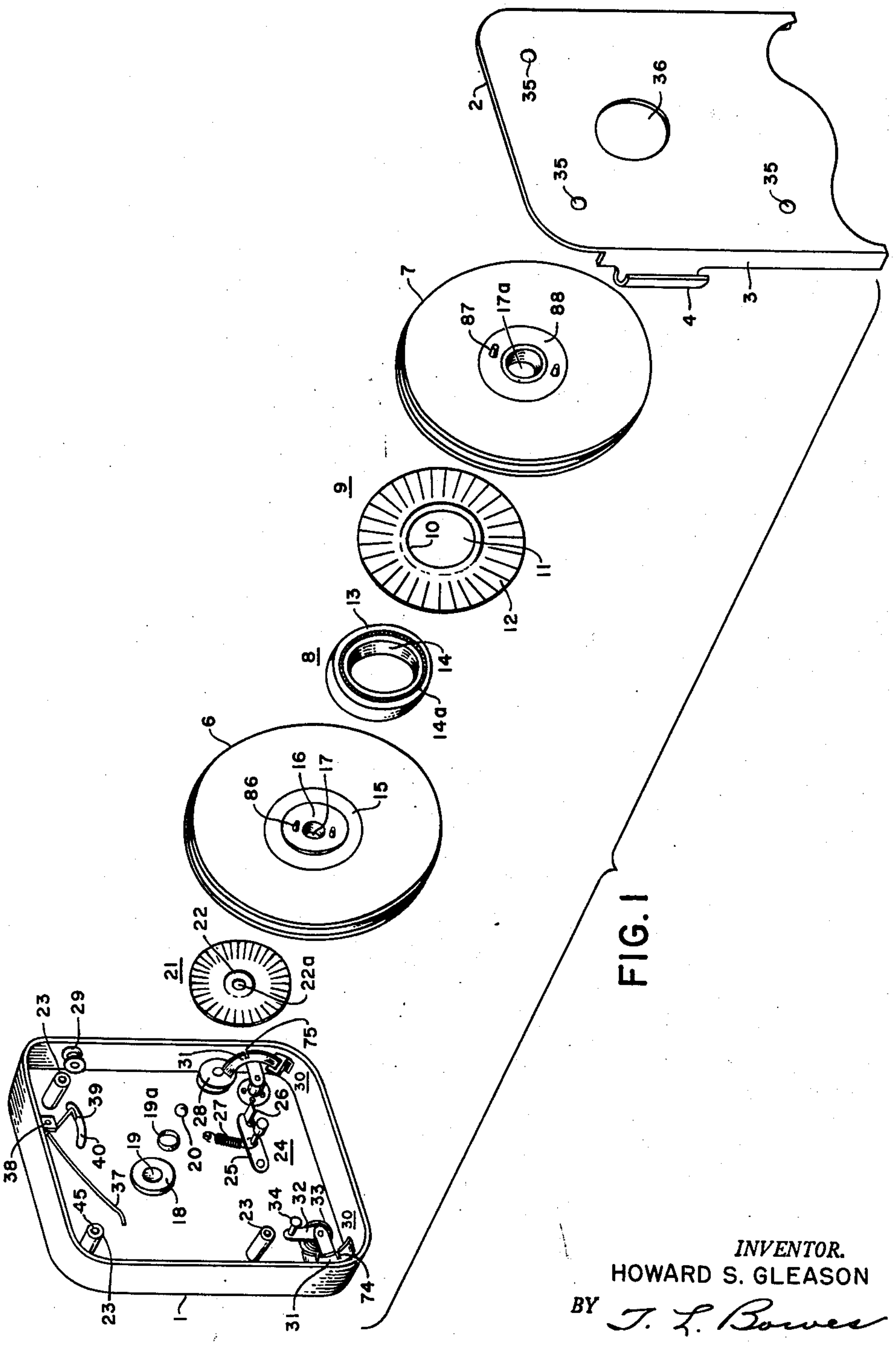
Figure 2:
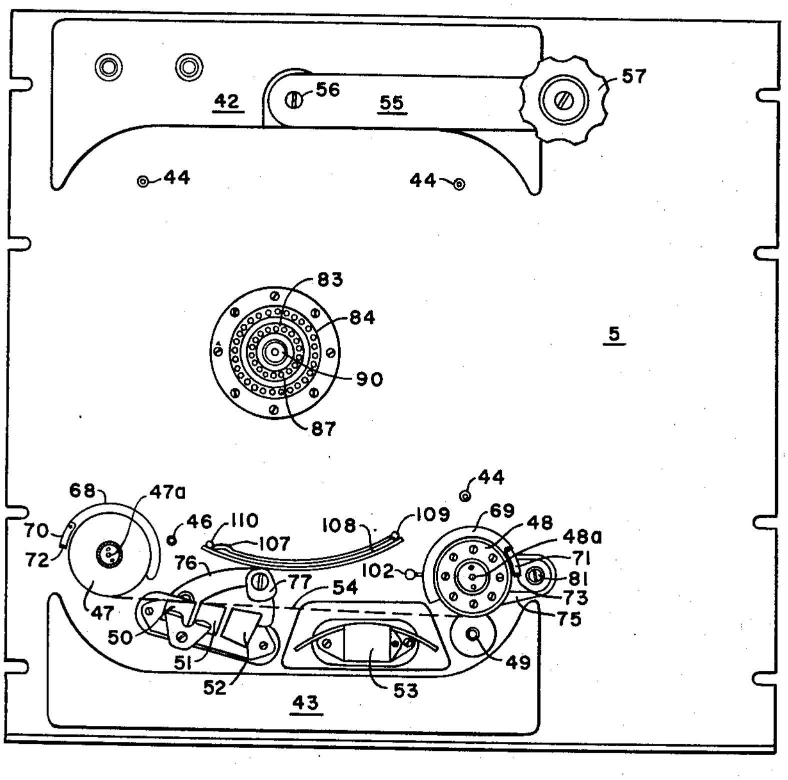
Figure 6:
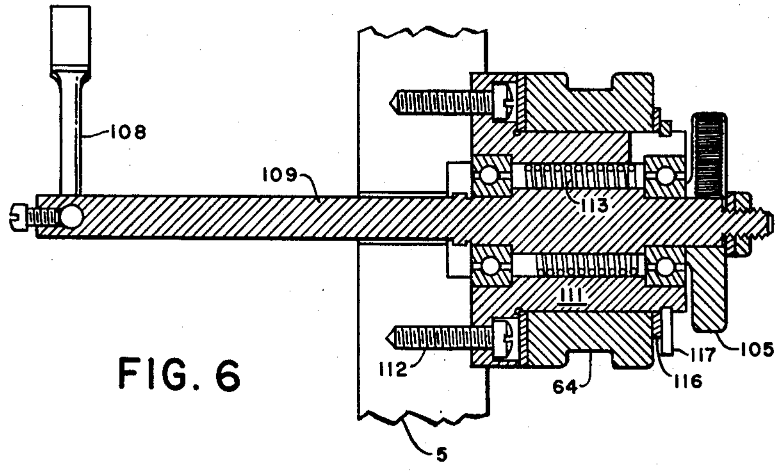
Figure 3:
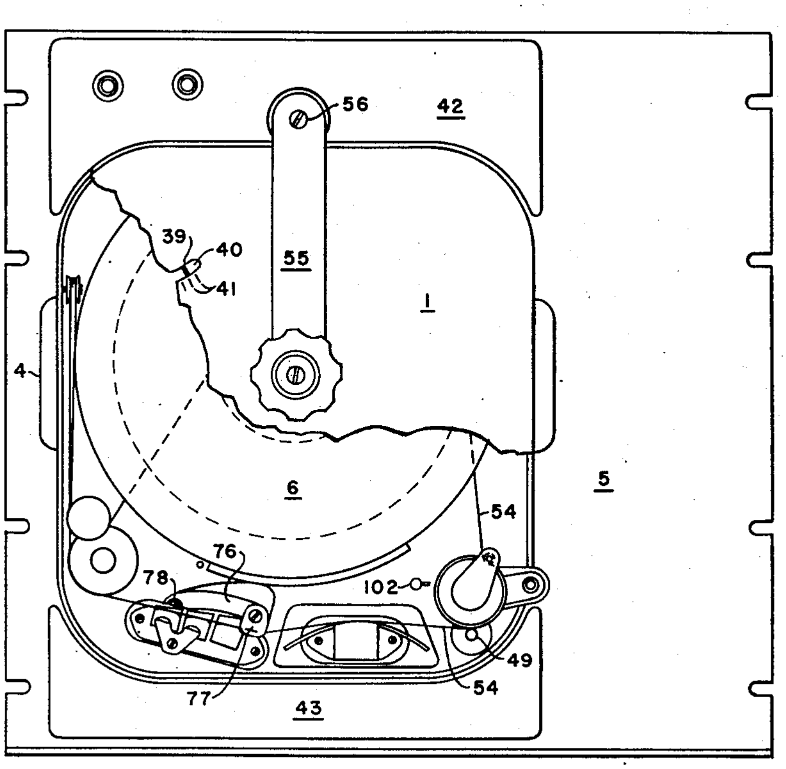
Figure 5:
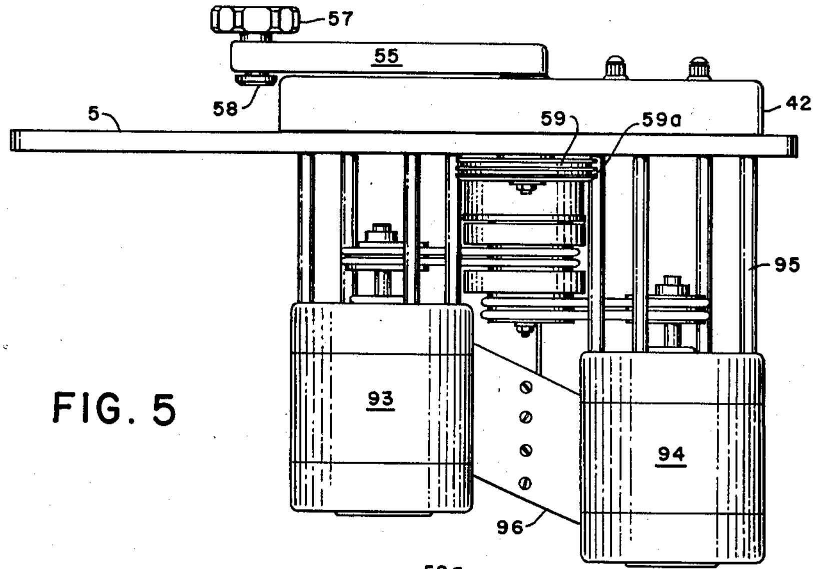
Figure 4:
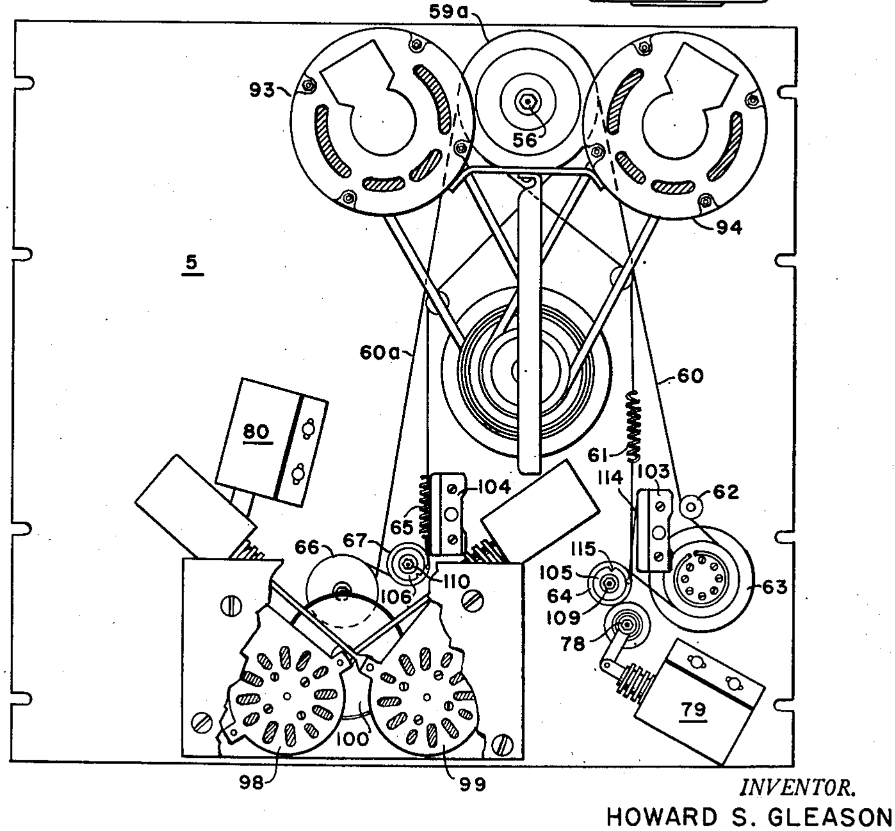
Figure 7:
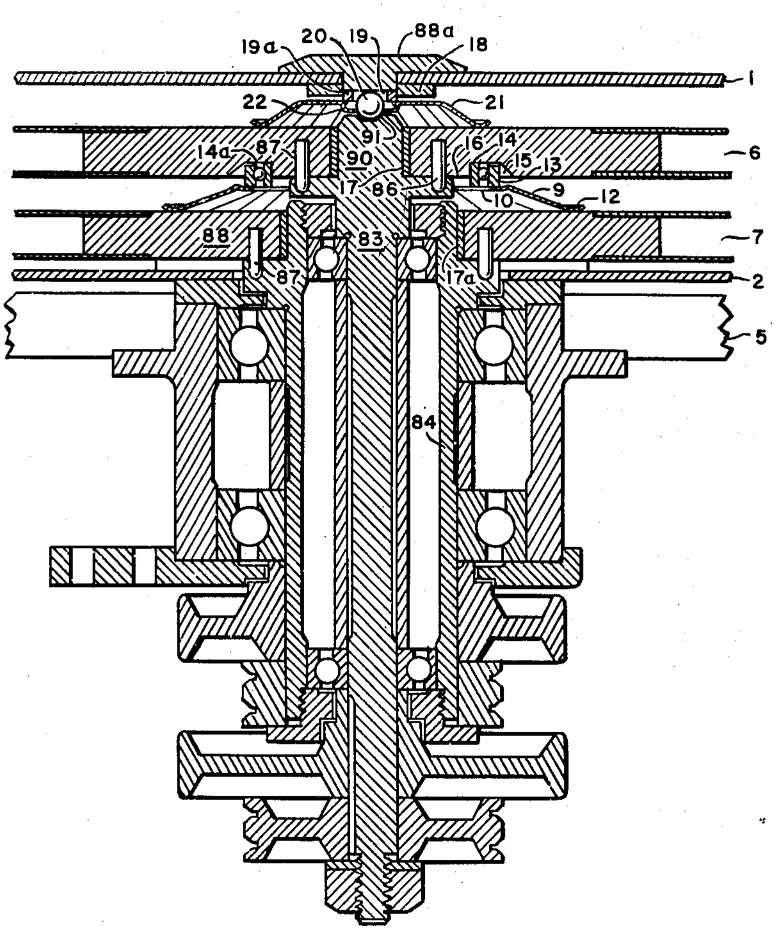

For a better understanding of my invention reference may be had to the accompanying drawings in which Fig. 1 is an exploded view of a magazine assembly embodying the principles of my invention, Fig. 2 is a front view of a panel illustrating a complete magnetic recording and reproducing system with the magazine removed, Fig. 3 is a view similar to Fig. 2 but showing the magazine in place, Figs. 4 and 5 are back and top views respectively of a magnetic recording and reproducing system assembly embodying the magazine shown in Figs. 1 and 3, Fig. 6 shows certain details of the magazine assembly, and Fig. 7 shows the spindle assembly with reels associated therewith.

For a description of the magazine and the method of assembling it, reference is had to Fig. 1. The magazine, according to my invention, comprises a two-piece container or housing having the front cover 1 and a rear cover 2 and may be described as a rectangular box having rounded corners, the front cover being approximately a box having a substantially rectangular surface surrounded by four walls at right angles to the main surface. The rear cover is essentially a flat member with a pair of flanges 3 extending from opposite sides. Each of flanges 3 is provided with a handle portion 4 for ready application of the assembled magazine to the panel 5 (see Fig. 3) as well as withdrawal of the magazine from the panel.

There is arranged within the magazine a pair of coaxially arranged or disposed reels 6 and 7. Each of these reels is flanged as indicated in the drawings and is large enough in diameter to contain all the tape at any given time. In order that reels 6 and 7 may rotate coaxially and independently from each other, there is provided between them a thrust ball bearing assembly indicated generally by the numeral 8 and thrust means comprising substantially flat annular spring 9. Spring 9 is provided with a hub portion 10 and a centrally disposed opening 11 extending therethrough. Around the outer portion of spring 9 there is provided a number of outwardly extending flexible fingers 12, i. e., the outer edge of the ring 9 may be split to provide a number of spring leaves, and the spring 9 is slightly dished so that the outer portions of arms 12 extending into engagement with the front surface of reel 7. The ball bearing assembly 8 comprises an outer ring 13 and an inner ring 14 maintained in spaced apart relationship for relative rotation, as by means of a plurality of ball bearings 14*a*. The rear face of reel 6 is provided with a recess 15 concentric with a centrally disposed hub 16 having an opening 17 therethrough.

The annular recess 15 is of such shape and size as to receive ball bearing assembly 8, the cylindrical or outer surface of the hub or boss 16 having a press fit with the inner ring 14 of ball bearing assembly 8. The outer diameter of recess 15 is sufficiently large or is shaped to permit outer ring 13 of ball bearing assembly 8 to rotate about inner ring 14 without frictional engagement with the edge of recess 15. The hub 10 of spring 9 is arranged to ride on the outer ring 13 of ball bearing assembly 8. With this arrangement it is seen that the rear reel 7 may be rotated with respect to the front reel 6.

In order to separate the front reel 6 from the front wall of the housing, there is provided on the inner surface of the front wall of cover member 1 a fixed anvil 18 having an opening or recess 19 centrally thereof, the recess containing collar or cylindrical insert 19*a*. In the assembled magazine, insert 19*a* forms a seat for ball 20, and ball 20 rotates with insert 19*a*. The relative sizes of insert 19*a* and ball 20 may be such that the ball does not engage all sides of the insert, i. e., the anvil serves merely to locate approximately the position of the ball 20 and to limit its lateral movement. A thrust bearing spring member 21 having a hub 22 with opening 22*a* centrally located therein, rides on the surface of ball 20 as shown in Fig. 7. Spring 21 is similar to spring 9 except that it may be of smaller size but similarly provides for rotation of reel 6 with respect to the front cover 1 of the magazine, the outer portions of the slightly dished annular spring 21 engaging the front surface of reel 6.

In order to facilitate the positioning of the parts during assembly there is provided a plurality of locating posts or members 23 in three of the corners of the magazine as shown in Fig. 1. Posts 23 are fixed in position. In order to complete the locating arrangement there is provided a reel clamp assembly 24 in the fourth corner of the magazine. Reel clamp 24 comprises an arm 25 pivotally carried on the front wall of cover portion 1 and a cam portion 26, the purpose of which is described later in the specification. Reel clamp 24 is preferably biased to a reel-engaging position as by means of a suitable spring 27.

In order to assemble the magazine shown in Fig. 1, the front cover is preferably placed so that the front wall is horizontal with the anvil 18 facing upwardly, ball 20 is placed in insert 19*a*, spring 21 is placed on the ball 20 with the hub 22 in engagement therewith, and reel 6 is laid on spring 21. If bearing assembly 8 has not previously been inserted in the recess 15 of reel 6, it is now placed in that position and spring 9 is then laid on reel 6 in such a way that hub 10 properly seats on outer ring 13. The rear reel 7 is then laid on spring 9.

Means is provided for guiding the tape carried by one of the reels 6 or 7 to the other reel within the magazine. For this purpose the tape from one reel is threaded around a relatively large idler 28 suitably mounted for rotation on the front wall of cover portion 1. Idler 28 is preferably mounted in the magazine at the same level as, and parallel to, the front reel 6 in the fully assembled arrangement of the magazine. From this point the tape is given a quarter twist and passed around a second idler 29 suitably mounted for free rotation on the side wall of cover 1, adjacent the idler 28. The second idler preferably has a diameter equal to the spacing of the two reels in their completely assembled positions, and the axis of idler 29 is perpendicular to the axis of the reels and half way between them. The tape is then passed around the reel 7. This arrangement permits the tape to run smoothly from one plane to another within the magazine.

Means is provided to move the tape aside on its passage from idler 29 to reel 7 whenever the magazine is not in position upon panel 5. For this purpose, there is provided a pair of loading sectors 30 having arcuate sector-portions 31 for engaging the tape during the assembly process. During loading, the tape, after being carried around idler 29 is passed around both loading sectors and thence to the other reel. These loading sectors 30 allow the tape to be placed around the idler and pressure roller, to be described later, on the tape transport panel 5.

The description of the magazine itself is not complete without reference to the provision of a tension arm 32 which is biased in a counterclockwise direction of rotation as by means of a suitable coil spring 33. After the tape is passed around sector 31, it is engaged by arm 34 of tension arm 32 whereby spring 33 maintains pin 34 against the tape.

There is also provided an indicator to enable the user of the apparatus to determine the amount of tape carried by reel 6, and may indicate footage, or time, for example. For this purpose, there is provided a suitably pivotally mounted arm 37 arranged to follow the surface of the tape upon reel 6 as by means of a suitable spring (not shown). The arm 37 may be pivotally carried as indicated by the numeral 38. Directly coupled to the arm 37 is the footage indicator 39 having a portion extending through a slot 40 in the front cover 1 to enable observation thereof. Reference indicia 41 may be provided, if desired, along one edge of slot 40.

The rear cover 2 may be placed upon front cover portion 1, the cover being retained by engagement of the side flanges 3 with opposite sides of front cover 1. In order to locate cover 2 accurately with respect to cover 1, there is provided in cover 2 a plurality of openings 35 arranged to receive the outer ends of post 23. Centrally of cover portion 2 there is provided an opening 36 in axial alignment with the various openings in the reels 6 and 7, springs 9 and 21, the ball bearing assembly 8, insert 19*a*, and anvil 18.

With the arrangement shown herein, the various controls, motors for operating the apparatus, heads and other apparatus are carried on a base or panel 5. In this connection, on the front surface of panel 5 there is provided a pair of upper and lower members 42 and 43, respectively, having opposed edge surfaces shaped complementary to the upper and lower edges of the magazine in order to locate generally the magazine on the panel 5. In order to locate the magazine more exactly there are provided tapered pins 44 corresponding in number and position to posts 23 and arranged to enter suitable openings 45 in the ends of posts 23.

Means is provided for removing the reel clamp from its reel engaging position to remove the pressure tending to urge the reels against the post 23 as the magazine is moved into its place on panel 5. For this purpose there is provided on the front surface of panel 5 a reel lock cam post 46 so disposed as to engage the cam surface 26 of reel clamp 24 and move the latter away from its reel engaging position.

There are shown, in the lower portion of Fig. 2, an erasing head 50, a speed control head 51, and recording head 52 immediately adjacent each other, and also a suitable playback head 53. The lower portion of rear cover 2 is cut away so that the magazine readily fits over idler 47 and pressure roller 48 as well as the various heads.

Means is provided for locking in position the magazine and, at the same time, transferring the tape 54 from the loading sectors 30 to the idler 47 and pressure roller 48. Idler 47 is suitably pivotally mounted for rotation upon the panel 5 as by means of a suitable pivot 47a. The pressure roller 48 is pivotally mounted as by means of a suitable pivot member 48a on a suitable arm 75 which is pivotally mounted on pivot 81 as hereinafter disclosed. The locking means comprises a loading or locking arm 55 pivotally mounted on the upper member 42 as indicated by the numeral 56. The loading arm may also be provided with a suitable handle 57 and on the rear face thereof with a suitable magazine engaging portion 58 which, in the locking position, engages the face plate 58a on the outside surface of cover 1 opposite the anvil 18.

In back of panel 5, there is carried by pivot 56, a pair of pulleys 59 and 59a which engage control cables 60 and 60a, respectively. Cable 60 extends from spring 61 around pulley 59, guide pulley 62, sector release pulley 63, and guide pulley 64, to the lower end of spring 61. Control cable 60a similarly is connected at one end to spring 65, and passes around pulley 59a, sector release pulley 66 and guide pulley 67 to the lower end of spring 65. Thus, as loading arm 55 is moved through a quarter turn, pulleys 59 and 59a similarly move a quarter of a turn in a counter-clockwise direction as viewed in Fig. 4, thereby moving sector release pulleys 63 and 67 in a manner to move the loading sectors from their tape engaging positions in which the tape engages idler 47 and pressure roller 48. For this purpose there is provided a pair of arcuate slots 68 and 69 around the circumference of idler 47 and roller 48, respectively. Extending therethrough from the front faces of the sector release pulleys 63 and 66, respectively, are members 70 and 71, respectively, having sector release engaging portions 72 and 73 which enter suitable slots 74 and 75, respectively, in the edges of the loading sectors 30.

With the magazine assembled on panel 5 and the locking arm in the locked position but without the panel 5 being energized by the application of power thereto, the tape 54 is in the position shown in the dashed line of Fig. 2.

Means is provided for moving tape 54 into operative relationship with respect to the various heads upon the application of power. For this purpose there is provided tape position arm 76 having a tape engaging portion 77 pivotally mounted as by means of a suitable pivot 78 extending backwardly through the panel 5. The rear end of pivot 78 is operatively connected to a tape position arm solenoid of any suitable type as indicated by the numeral 79 so that when power is applied to the solenoid 79, the arm 76 and tape engaging portion 77 are moved clockwise as viewed in Fig. 2 to press the tape 54 downwardly into the position shown in Fig. 3. The pressure roller solenoid, indicated by the numeral 80, is employed to rotate the pressure roller 48 about its pivot 81 at any suitable time, thereby moving tape 54 against capstan roller 49.

Means is provided for moving the magnetic signal carrier or medium 54 across the heads from the supply reel 7 to the takeup reel 6. For this purpose there is provided a pair of concentrically arranged drive spindles 83 and 84 for operative engagement with reels 6 and 7, respectively. The driving spindle assembly extends through the opening 36 in the rear cover. The driving spindle 83 also extends through the aligned openings 17a of reel 7 and opening 11 in spring 9 into engagement with hub 16 of reel 6. Hub 16 is provided with a pair of rearwardly extending diametrically opposed pins 86. The outer end of spindle 83 is provided with a plurality of diametrically opposed pairs of openings 87. The two pins on the reel hub engage with any of the multiplicity of pairs of diametrically opposite holes in the coaxial drive spindle 83. In a similar manner, the outer drive spindle 84 has a plurality of openings, a pair of which is adapted to engage with the diametrically opposite pins 87 carried by the hub 88 of reel 7 and direct drive is thereby provided between drive spindle 84 and reel 7. The outer edges of the ends of drive spindles 83 and 84 may be chamfered or otherwise tapered to assist in the ready application of the reels to the ends of the drive spindles.

In order to further accurately align the drive mechanism and the relative position of the magazine with respect to panel 5, there is provided a central boss or extension 90 concentrically arranged with respect to the drive spindle 83 and extending beyond the spindles and through the central opening 17 in reel 6 into engagement with ball 20, the outer end of boss 90 having a recess 91 for that purpose. The outer edge of the end of boss 90 is chamfered or otherwise tapered to assist in aligning the various parts.

Referring to Figs. 4 and 5, there is shown a take-up reel motor indicated by the numeral 93 and a supply reel motor indicated by numeral 94 suitably mounted on the back of panel 5 by a plurality of suitable standoffs 95 and bracket 96. These motors are arranged to drive the spindles 83 and 84 extending through panel 5 into the interior of the magazine as previously described. The motors 93 and 95 are so arranged that they tend, in the absence of restriction of movement, to move the tape 54 in opposite directions, and thereby continually maintain tension on the tape 54 and prevent it developing loops or slack in any way. For example, the takeup reel motor may be supplied with 110 volts and the supply reel motor with 55 volts thereby resulting in a forward movement of the tape 54, i. e., a movement of the tape suitable for recording, but inasmuch as supply reel motor 94 is energized in a way to tend to cause it to resist the movement of the tape 54 toward the takeup reel, tension is maintained on the tape.

Motors 93 and 94 may be of any suitable type but I prefer to use alternating current induction motors having a torque speed characteristic of such a nature that the torque varies inversely with the speed of the motor so that as the amount of tape carried by the associated reels changes, the speed of travel of the tape tends to remain constant. Spindles 83 and 84 are driven from motors 93 and 94 by means of suitable pulleys and belts as indicated in Fig. 5. In order to further assure constant tape speed there is provided the capstan 49, previously referred to. In the particular application for which the magazine was developed, it was desired to have readily available two speeds, both for recording and for playback. Therefore, there has been provided a slow speed capstan motor 98 and a fast speed capstan motor 99 as seen in Fig. 4. When a suitable switch (not shown) is operated to cause movement of the tape through the agency of motors 93 and 94, one or the other of the capstan motors is similarly energized to drive capstan flywheel 100 in any suitable manner as by means of suitable pulleys and belts. I prefer to use synchronous motors for the capstan motors in order that a substantially constant capstan speed is attained.

In order to recapitulate, when the power is turned on, the tape positioning arm solenoid is energized to move the tape to the recording-playback position and the pressure roller solenoid is energized to press the roller and therefore the tape against the capstan. The takeup reel, the supply reel, and the selected capstan speed motor are also energized to move the tape from the supply reel to the takeup reel.

Means is provided to stop the apparatus if the tape breaks. For this purpose the tension arm mechanism is employed. As previously indicated, the tension arm is provided with a predetermined amount of spring bias but the tape prevents movement of the arm 32 in response thereto. If the tape breaks, however, the quarter clockwise movement (as viewed in Fig. 1) is no longer prevented and the tension arm moves in a counter-clockwise direction. A suitable switch may be associated in any desired manner, not shown, with the movement of the tension arm so that the supply of power to the various motors and solenoids is broken upon a sufficient counter-clockwise movement of the tension arm. For example, a microswitch may have an operating arm 102 extending through the panel 5 and upon engagement by pin 34 the power circuit may be broken.

Means is provided for stopping the drive mechanism at the ends of the tape movement. For this purpose, there is provided a reverse limit switch 103 and a forward limit switch 104 arranged to be operated by cam wheels 105 and 106, respectively. Referring to Fig. 2, there are shown two limit arms 107 and 108 suitably carried on pivots 109 and 110, respectively, these pivots also carrying pulleys 64 and 67, respectively. Referring to Fig. 6, it is seen that pivot 109 is arranged for limited rotation within hub 111, the latter being secured to panel 5 in any suitable manner, as by screws 112, for example. In order to permit limited rotation and to bias follower arm 108 to engage the tape carried by the associated reel, there is provided a suitable coil spring 113 secured at one end to hub 111 and at the other to shaft or pivot 109. Cam wheel 105 is secured to the end of pivot 109 in any suitable manner. In the non-locking position of loading arm 55, arm 108 is rotated against the tension of spring 113 to the position shown in Fig. 2 by the engagement of member 116 carried by pulley 64 and arm 117 carried by cam 105. As arm 55 is moved to its locking position, pulley 64 is rotated as explained above, thereby removing the restraint on arm 108, and arm 108 moves into engagement with the tape and follows the level of the tape. At a predetermined position of arm 108, cam 105 has been rotated to a position in which armature 114 of micro-switch 103 enters recess 115 in cam 105 and the energizing circuit is broken. Limit switch 104 is operated in a similar manner to halt operation of the apparatus at a predetermined position of arm 107 associated with the other reel.

Means is provided for rewinding the tape from the takeup reel to the supply reel. This means is not shown but may comprise, for example, means for reversing the voltages on the takeup reel motor 93 and supply reel motor 94, respectively, so that the motors will be driven in such a way as to return the tape to the supply spool or reel. Inasmuch as constant speed is of less importance in the rewind cycle, the capstan motors are preferably not energized during the rewinding operation.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. A magazine assembly comprising a housing having a front cover and a rear cover, a pair of coaxially disposed reels, means adjacent the outer edges of said reels for approximately locating said reels during the assembly and loading of said magazine, first thrust means between said front cover and the front face of one of said reels, bearing means carried by said one reel, second thrust means disposed between said bearing means and the front face of the other of said reels, and means for guiding the passage of a tape or the like between said reels.

2. In magnetic recording apparatus, a magazine, a pair of coaxially disposed reels arranged within said magazine, first thrust means arranged between said front cover and the front face of one of said reels, bearing means carried by said one reel, second thrust means arranged between said bearing means and the front face of the other of said reels, centrally and axially disposed aligned openings in said reels and said thrust means and said bearing means, means carried by said apparatus and extending through said openings into engagement with each of said reels for rotating each of said reels, and means carried by said front cover for centering said rotating means.

3. In magnetic recording apparatus, a magazine, a pair of coaxially disposed reels arranged within said magazine, first spring means arranged between said front cover and the front face of one of said reels, bearing means carried by said one reel, second spring means arranged between said bearing means and the front face of the other of said reels, centrally and axially disposed aligned openings in said reels and said spring means and said bearing means, and means carried by said apparatus and extending through said openings into engagement with each of said reels for rotating each of said reels.

4. A magazine assembly for tape and the like including a housing, a pair of reels disposed in coaxial side-by-side relationship within said magazine housing, a ball-bearing seat on the inner surface of the front wall of said housing, a ball-bearing disposed in said seat, a slightly dished annular pressure spring supported on said ball bearing and engaging one surface of one reel in the vicinity of the outer edge of said spring, a ball-bearing assembly mounted on the other surface of said one reel, a second slightly dished annular pressure spring supported at its inner periphery by said ball-bearing assembly, said ball-bearing assembly being arranged to permit relative motion between said reels, said second spring engaging the inner surface of said other reel in the vicinity of the outer edge of said second spring, said reels, said springs, and said ball-bearing assembly having centrally located and axially aligned openings, a shaft extending through each of said aligned openings and having an end engaging said ball bearing, concentrically arranged driving means carried by said shaft for separately causing rotation of said reels, one of said driving means engaging said other face of said one reel for rotating said one reel, another of said driving means engaging the outer face of said other reel for rotating said other reel, said first spring acting as a thrust bearing for said one reel, and said second spring acting as a thrust bearing for said other reel.

5. A magazine assembly for tape or the like comprising a housing, a pair of reels disposed in coaxial side-by-side relationship within said housing, a ball-bearing seat on the inner surface of the front wall of said housing, a ball-bearing disposed in said seat, a slightly dished annular pressure spring supported on said ball bearing, and engaging one surface of said one reel in the vicinity of the outer edge of said spring, the other face of said one reel having an annular groove defining a central hub, a ball-bearing assembly having concentric rings spaced by a plurality of ball bearings, the inner ring having a press-fit with the outer surface of said hub, whereby the outer ring of said ball-bearing race is rotatably mounted on said one reel, a second slightly dished annular pressure spring supported at its inner periphery on said outer ring of said ball-bearing assembly and engaging the inner surface of said other reel in the vicinity of the outer edge of said second spring, the said reels, springs, and bearing assembly having centrally arranged and axially aligned openings, a shaft extending through each of said aligned openings and having an end engaging said ball bearing, concentrically arranged driving means carried by said shaft for separately causing rotation of said reels, one of said driving means engaging said hub for rotating said one reel, another of said driving means engaging the outer face of said one reel for rotating said other reel, said first spring acting as a thrust bearing for said one reel, and said second spring acting as a thrust bearing for said other reel.

HOWARD S. GLEASON.

References Cited in the file of this patent

UNITED STATES PATENTS

| Number | Name | Date |
|---|---|---|
| 1,568,067 | Howell | Jan. 5, 1926 |
| 2,183,522 | Wittel | Dec. 19, 1939 |
| 2,349,018 | Tasker | May 16, 1944 |
| 2,401,632 | Greenleaf | June 4, 1946 |
| 2,477,146 | Scherbatskoy | June 26, 1949 |
| 2,526,051 | Shroder | Oct. 17, 1950 |
| 2,535,478 | Arndt et al. | Dec. 26, 1950 |
| 2,550,556 | Haloski | Apr. 24, 1951 |